No. 717,587. PATENTED JAN. 6, 1903.
J. P. LORD.
STERILIZER.
APPLICATION FILED FEB. 1, 1896.
NO MODEL.

WITNESSES:

INVENTOR
John P. Lord
BY
ATTORNEY.

UNITED STATES PATENT OFFICE.

JOHN P. LORD, OF OMAHA, NEBRASKA.

STERILIZER.

SPECIFICATION forming part of Letters Patent No. 717,587, dated January 6, 1903.

Application filed February 1, 1896. Serial No. 577,717. (No model.)

*To all whom it may concern:*

Be it known that I, JOHN P. LORD, residing at Omaha, in the county of Douglas and State of Nebraska, have invented certain useful Improvements in Sterilizers; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in portable sterilizers, more particularly adapted to the use of physicians and surgeons.

Figure 1:
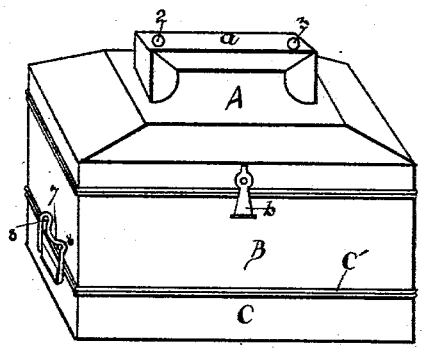
Figure 2:
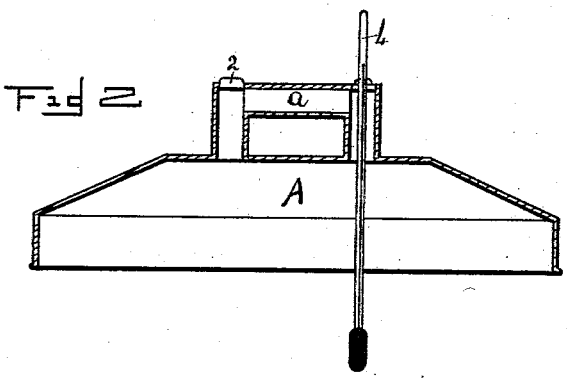
Figure 3:
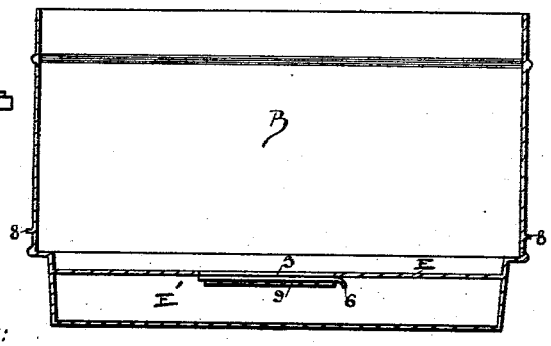

In the accompanying drawings I have shown in Figure 1 a perspective view of a sterilizer embodying my invention. Fig. 2 shows a central sectional view of the top of my sterilizer, while Fig. 3 shows a sectional view of the sterilizer proper.

The object of my invention is to provide a sterilizer that shall be light, portable, and of a convenient shape, so that the same may be easily packed in a satchel and being of sufficient size to serve as an aseptic-receptacle for all dressings required in ordinary surgical operations.

In carrying out the aim of my invention I provide a suitable receptacle B of a convenient shape and size, which is provided below with an extending bottom portion E', which is divided from the receptacle B by means of the intermediate bottom E, provided with a suitable opening 5. This opening 5 is closed by means of a suitable slide 6, supported by the flanges 9, secured to the bottom E for the purpose of holding this slide 6. In conjunction with this receptacle B, I use a top A of a peculiar construction, which is provided with two perforations above and has a hollow handle $a$ in the form of an approximately C-shaped tube, which extends from the openings, as clearly shown in Fig. 2, and in alinement with the vertical portions of this handle. The same is perforated and provided with the plugs 2 and 3, so that through this plug may be inserted a suitable thermometer 4, as is disclosed in Fig. 2.

It is of course understood that in connection with my sterilizer any suitable heating apparatus may be used, and it should further be understood that these sterilizers can be made of any suitable size.

In connection with the receptacle B, I use a tray C, into which the bottom E' is adapted to work, as is shown in Fig. 1.

This sterilizer or receptacle B proper at suitable points is provided with the outwardly-projecting pins 8, as is shown in Fig. 3, over which the handles 7 of the tray C work to secure the trays to the receptacle, as shown.

Now, having thus described my said invention, what I claim as new, and desire to secure by United States Letters Patent, is—

The combination with a sterilizer of the top A provided with two perforations upon the top, of a hollow handle $a$ extending from said perforations, said handle $a$ being provided with openings in alinement with said top perforations and the plugs 2 and 3 to close said handle-perforations, all arranged substantially as and for the purpose set forth.

In testimony whereof I affix my signature in presence of two witnesses.

JOHN P. LORD.

Witnesses:
W. J. GALBRAITH,
NORA M. SHURE.